United States Patent [19]

Haaf et al.

[11] 4,277,575

[45] Jul. 7, 1981

[54] IMPACT MODIFIER FOR THERMOPLASTIC COMPOSITIONS

[75] Inventors: William R. Haaf, Voorheesville; Charles P. Shank, Averill Park, both of N.Y.

[73] Assignee: General Electric Company, Pittsfield, Mass.

[21] Appl. No.: 81,125

[22] Filed: Oct. 2, 1979

[51] Int. Cl.³ ............................................. C08L 53/00
[52] U.S. Cl. ....................................................... 525/89
[58] Field of Search ......................................... 525/89

[56] References Cited

U.S. PATENT DOCUMENTS

| | | | |
|---|---|---|---|
| 3,231,635 | 1/1966 | Holden et al. | 260/880 |
| 3,251,905 | 5/1966 | Zelinski | 260/879 |
| 3,383,435 | 5/1968 | Cizek | 260/874 |
| 3,431,323 | 3/1969 | Jones | 260/880 |
| 3,994,856 | 11/1976 | Katchman et al. | 525/89 |
| 4,113,800 | 9/1978 | Lee | 525/89 |
| 4,145,377 | 3/1979 | Bussink et al. | 525/89 |

FOREIGN PATENT DOCUMENTS 1145923  3/1969  United Kingdom.

OTHER PUBLICATIONS

Encyclopedia of Polymer Sci. & Technology, vol. 15, Interscience, N.Y., pp. 508-530 (1970).

Primary Examiner—Harry Wong, Jr.
Attorney, Agent, or Firm—Morgan, Finnegan, Pine, Foley & Lee

[57] ABSTRACT

An improved impact modifier is described. The modifier is an admixture of a diblock copolymer of polystyrene/saturated rubber with a triblock copolymer of polystyrene/ethylene-butylene rubber/polystyrene which significantly improves the properties of a polyphenylene oxide and polystyrene composition.

7 Claims, No Drawings

IMPACT MODIFIER FOR THERMOPLASTIC COMPOSITIONS

BACKGROUND OF THE INVENTION

Thermoplastic compositions comprising polyphenylene oxide and styrene resin are well known. Such compositions are described, for example, in U.S. Pat. No. 3,383,435 of Eric P. Cizek, the disclosure of which is incorporated herein by reference.

These compositions exhibit unusually desirable properties which make them useful throughout a broad range of applications. Of particular importance are their high impact strengths. These make them especially useful in the manufacture of molded parts which must be durable.

Notwithstanding these properties, however, means for obtaining still greater improvement have been sought. This search has been directed, in particular, toward the identification of further impact modifiers.

INTRODUCTION TO THE INVENTION

It has been discovered that an admixture of a diblock copolymer of polystyrene/saturated rubber with a triblock copolymer of polystyrene/ethylene-butylene rubber/polystyrene may be utilized to improve the impact strength of compositions of polyphenylene oxide and styrene resin. The two copolymers of this admixture act in synergistic manner to provide an unexpected increase in this important property of thermoplastic compositions.

DESCRIPTION OF THE INVENTION

The polyphenylene oxide and styrene resin compositions subject to improvement in accordance with the present invention are, as previously indicated, well known and readily available. There are, however, various preferred compositions. These are primarily ones commonly having applications for which high impact strength is particularly desirable.

The polyphenylene oxide in these preferred compositions includes polymer having the repeating structural unit:

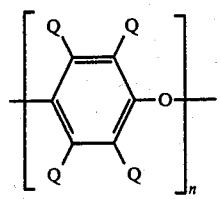

wherein the oxygen (or ether) atom of one unit is connected to the nucleus of the next adjoining unit; n is a positive integer of at least 50; and the Q's are each independently selected from monovalent substituents comprising hydrogen, halogen, hydrocarbon radicals, halohydrocarbon radicals and hydrocarbonoxy radicals.

There are also preferred styrene resins useful in the composition. These are ones formed from monomer having the formula:

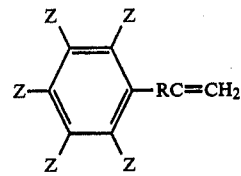

wherein R is hydrogen, lower alkyl or halogen and each Z is independently selected from monovalent constituents comprising hydrogen, lower alkyl, vinyl and halogen. Included among these preferred polymers are modified styrene resins such as rubber modified polystyrenes, and the styrene containing copolymers such as the styreneacrylonitrile copolymers (SAN), styrenebutadiene copolymers, styrene-acrylonitrile-α-alkyl styrene copolymers, styrene-acrylonitrile-butadiene copolymers (ABS), poly-α-methylstyrene, copolymers of ethylvinyl-benzene and divinylbenzene, and the like. The most preferred styrene resins are unmodified "crystal" homopolystyrenes.

The method of combining the polyphenylene ether with the styrene resin is not critical and does not constitute a part of the invention. The preferred method comprises mixing the two polymers in powder or granular form, extruding, chopping into pellets and re-extruding.

These compositions may be utilized in any proportion. Most desirable, however, the polyphenylene oxide and styrene resin are present in a weight ratio of from 2:1 to 1:2, respectively.

The impact modifiers of the present invention comprise an admixture of a diblock copolymer of polystyrene/saturated rubber with a triblock copolymer of polystyrene/ethylene-butylene/polystyrene. Such admixtures may be combined with the other ingredients when, and in the same manner as, the composition is formed or they may be preformed and then combined with the composition. Preferably, the diblock constitutes from 1 to 50% of the diblock-triblock mixture.

The proportions of the modifier admixtures and the other components may also vary widely. Generally, however the admixture comprises only up to 40%, more preferably from 10% to 20%, by weight of the total composition.

Styrene-diene block copolymers of the A-B-A and the AB type and methods for their preparation are known, e.g., from the Encyclopedia of Polymer Science and Technology, Vol. 15, Interscience, N.Y., pages 508–530 (1971). See also, U.K. Pat. No. 1,145,923 and Jones U.S. Pat. No. 3,431,323 for specific preparative methods. Radial teleblock forms of such polymers are also known, see, e.g., Zelinsky, U.S. Pat. No. 3,251,905, and also Holden et al., U.S. Pat. No. 3,231,635. All such block copolymers can be selectively hydrogenated by techniques known in this art. All are commercially available, e.g., the di-block product KR-01 from Phillips Petroleum Co.; or Shellvis 50, a styrene-saturated rubber diblock copolymer from Shell Chemical Co., Kraton G-1652, the selectively-hydrogenated styrene-butadiene-styrene triblock polymer of Shell Chemical Co., and Solprene 404, the styrene-butadiene radial teleblock copolymer of Phillips Co. The publications and patents are incorporated herein by reference.

Particular copolymers are preferred for forming the present admixtures. These include diblock in which the weight ratio of styrene to saturated rubber is from 1:4 to 1:1. The diblock also desirably has a molecular weight in excess of 50,000, preferably from 75,000 to 150,000. Correspondingly, the triblock desirably has a styrene to ethylene-butylene rubber weight ratio of from 1:5 to 1:1 and preferably has a molecular weight in excess of 20,000, most preferably of from 40,000 to 200,000.

A remarkable aspect of these compositions is the difference between their individual and composite effects on the properties of the present compositions. The diblock copolymer alone, for example, is essentially ineffective as an impact modifier. Yet, in the admixture, the diblock interacts with the triblock copolymer to produce a dramatic increase in its effect. Moreover, the increase due to the admixture of both components may result in far greater impact strength than would result from an equal amount of the triblock alone.

The reason for this phenomenon is not understood. Generally, however, a di- to tri-copolymer weight ratio of between 1:1 to 1:4 is utilized, unless it is desired to emphasize specific forms of impact strength or other properties of the composition.

Other modifier ingredients customarily included within the instant class of plastic compositions may also be present. These include additional polymer, filler, pigment and the like. They perform in the manner for which they are already known and do not interfere with the advantages of the present invention.

The following example are given by way of illustration only and are not intended as a limitation on the scope of this invention. Many variations are possible without departing from their spirit and scope. Unless otherwise specified herein, all proportions are provided on a weight basis.

EXAMPLES 1-3

Five thermoplastic compositions are prepared. They differ primarily in the impact modifiers employed. For comparative purposes these compositions include modifiers containing the present admixtures of diblock with triblock copolymers, as well as ones comprising only individual such copolymers.

The samples and test results for this comparison are as follows:

| | Composition (Percentage by Total Weight) | | | | | | | | |
|---|---|---|---|---|---|---|---|---|---|
| | Blend | | Modifier | | | | Tensile | | |
| Example | Polyphenylene oxide[1] | Polystyrene[2] | Diblock[3] | Triblock[4] | Izod | Gardner | Elongation | Yield | Break |
| A* | 50 | 35 | — | 15 | 4.5 | 270 | 50% | 7,800 | 7,400 |
| B* | 50 | 35 | 15 | — | 1.1 | 150 | 30% | 10,500 | 8,000 |
| 1 | 50 | 35 | 10 | 5 | 1.5 | 345 | 38% | 10,500 | 8,200 |
| 2 | 50 | 35 | 5 | 10 | 5.3 | 335 | 32% | 9,000 | 8,100 |
| 3 | 50 | 30 | 5 | 15 | 6.4 | 275 | 37% | 7,200 | 7,200 |

[1] PPO, obtained from General Electric Company, I.V. 0.48 dl./g. in chloroform at 30° C.
[2] Dylene 8G grade of "crystal" homopolystyrene; Mn (GPC) = 140,000, obtained from Atlantic Richfield Company
[3] Shellvis 50 grade of polystyrene/saturated-rubber block copolymer; Total MW = 102,000, PS/sat'd.-rub. ratio = 36/64 obtained from Shell Oil Company
[4] Kraton G 1652 grade of polystyrene/ethylene-butylene rubber/polystyrene triblock copolymer; obtained from Shell Oil Company
Izod - Notched Izod impact resistance (ft.-lbs./in.-notch); ⅛" × ½" × 2½" specimen
Gardner - Drop dart (Gardner) impact strength (in.-lbs.); ⅛" × 2½" × 3⅞" specimen
Tensile - Percent elongation, strength at yield (psi) and strength at break (psi); ⅛" × 2½" L-type specimen
*Control These data clearly substantiate the unexpected cooperation or synergism exhibited by the modifier admixtures of the present invention. The impact strengths of the admixtures (Examples 3 through 5) generally far exceed those of equivalent or greater amounts of triblock (A) or diblock (B) alone.

Other variations will become obvious to those skilled in this art in light of the above-detailed description. All such variations are within the full intended scope of the appended claims.

We claim:

1. In a thermoplastic composition comprising polyphenylene oxide and styrene resin, the improvement which comprises an impact strength improving amount of an impact modifier consisting essentially of an admixture of a diblock copolymer of polystyrene/saturated rubber with a triblock copolymer of polystyrene/ethylene-butylene rubber/polystyrene, wherein the diblock and triblock copolymers are in a weight ratio of di- to tri- form 1:1 to 1:4 and diblock constitutes from 1 to 50% of the diblock-triblock mixture.

2. The composition of claim 1, wherein theadmixture comprises from a minimum effective amount up to 40% by weight of the composition.

3. The composition of claim 1, wherein the polyphenylene oxide and styrene resin are in a weight ratio of from 2:1 to 1:2.

4. The composition of claim 1, wherein the admixture comprises between 10 to 20% by weight of the composition.

5. The composition of claim 4, wherein the styrene and saturated rubber of the diblock copolymer are in a weight ratio of from 1:4 to 1:1.

6. The composition of claim 5, wherein the styrene and ethylene-butylene rubber of the triblock copolymer are in a weight ratio of from 1:5 to 1:1.

7. The composition of claim 1, wherein the styrene resin is an unmodified ("crystal") homopolystyrene.

* * * * *